Feb. 28, 1933.  T. O. MEHAN  1,899,444
ADDING AND LISTING MACHINE
Filed Dec. 5, 1925    7 Sheets-Sheet 1
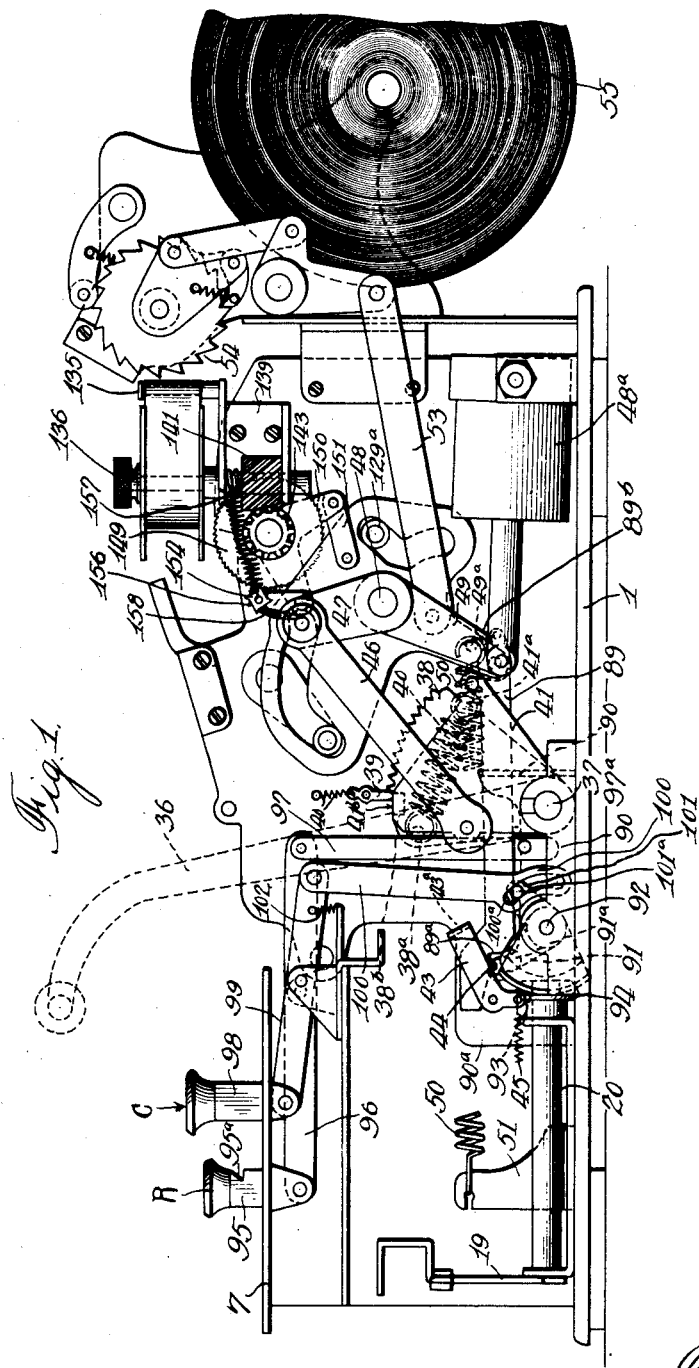
Inventor:
Thomas O. Mehan
By Williams, Bradbury,
McCaleb & Hinkle
Attys

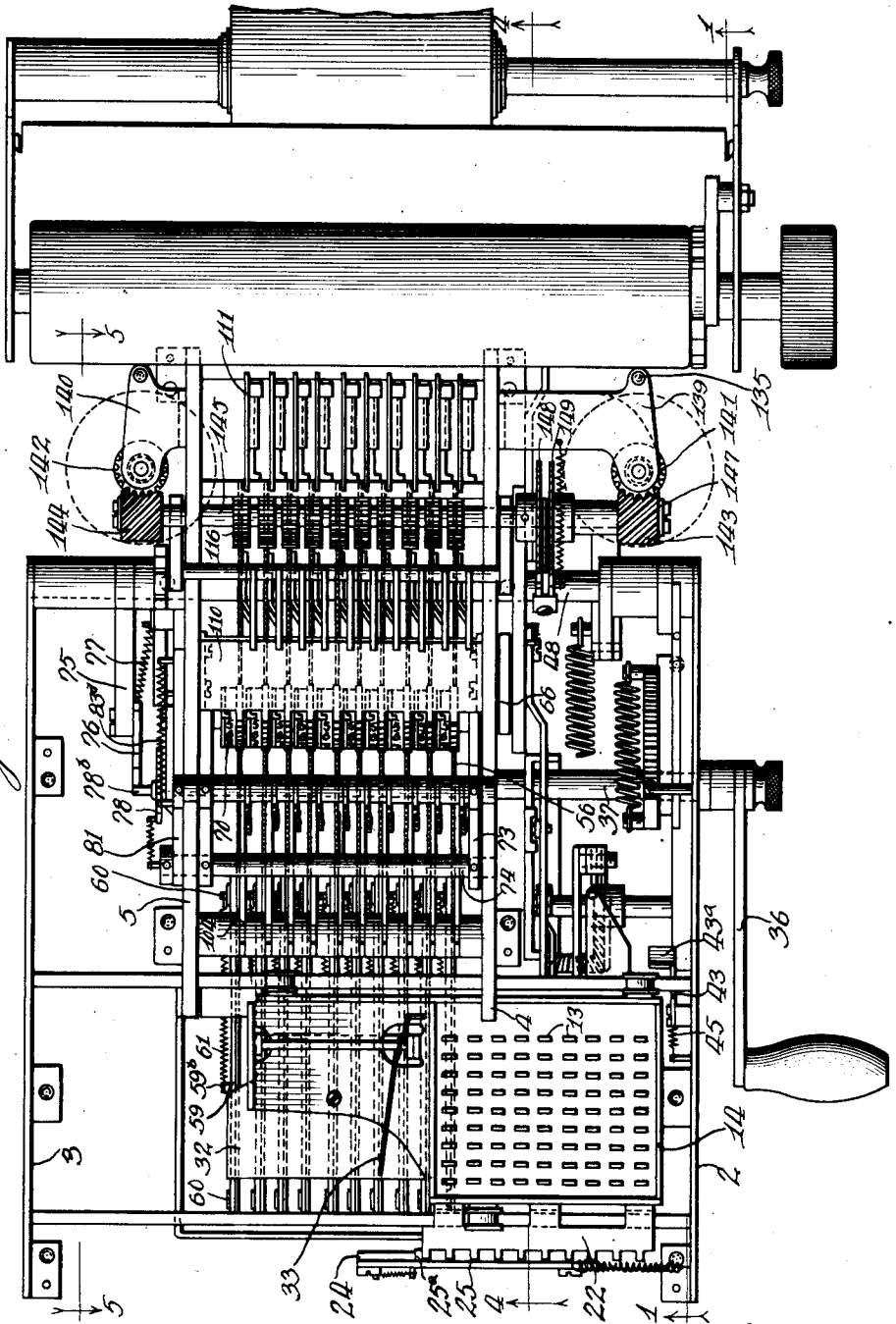

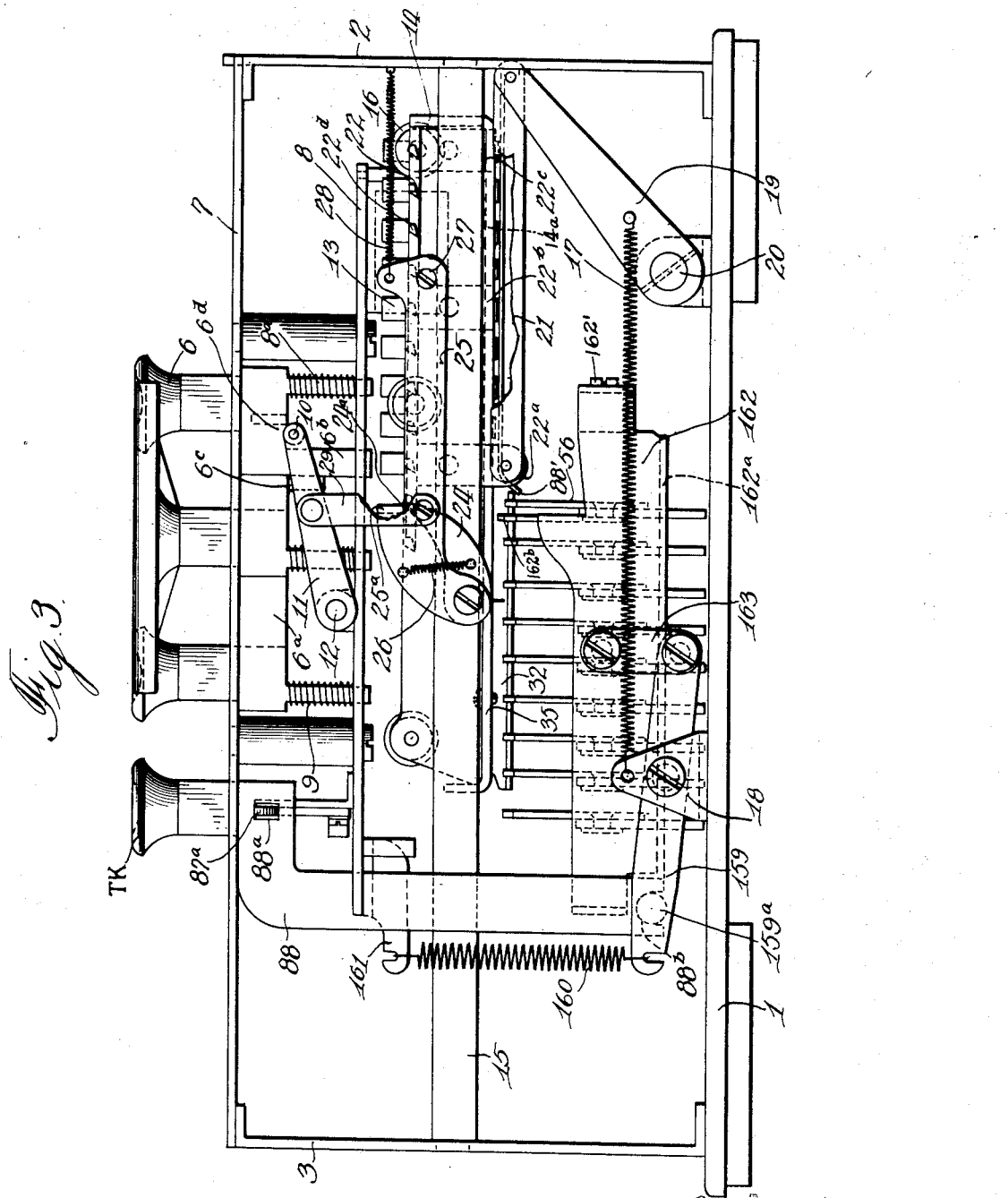

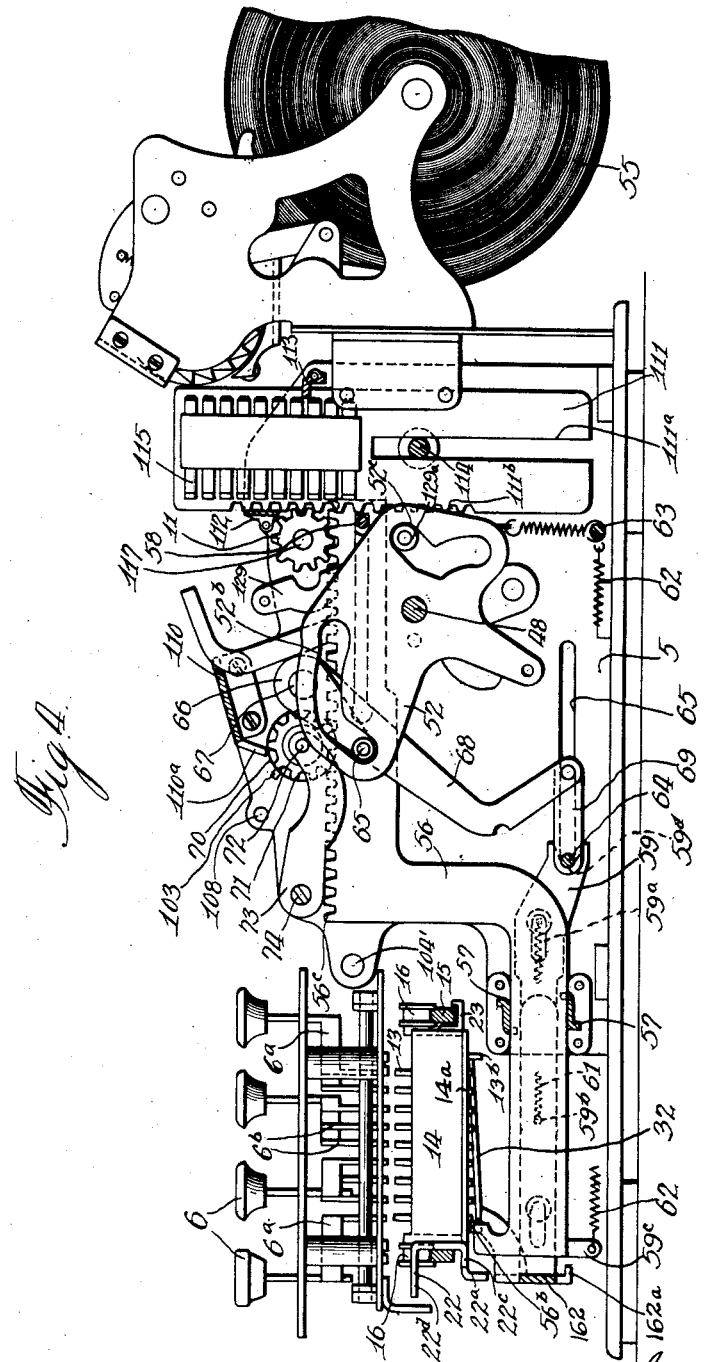

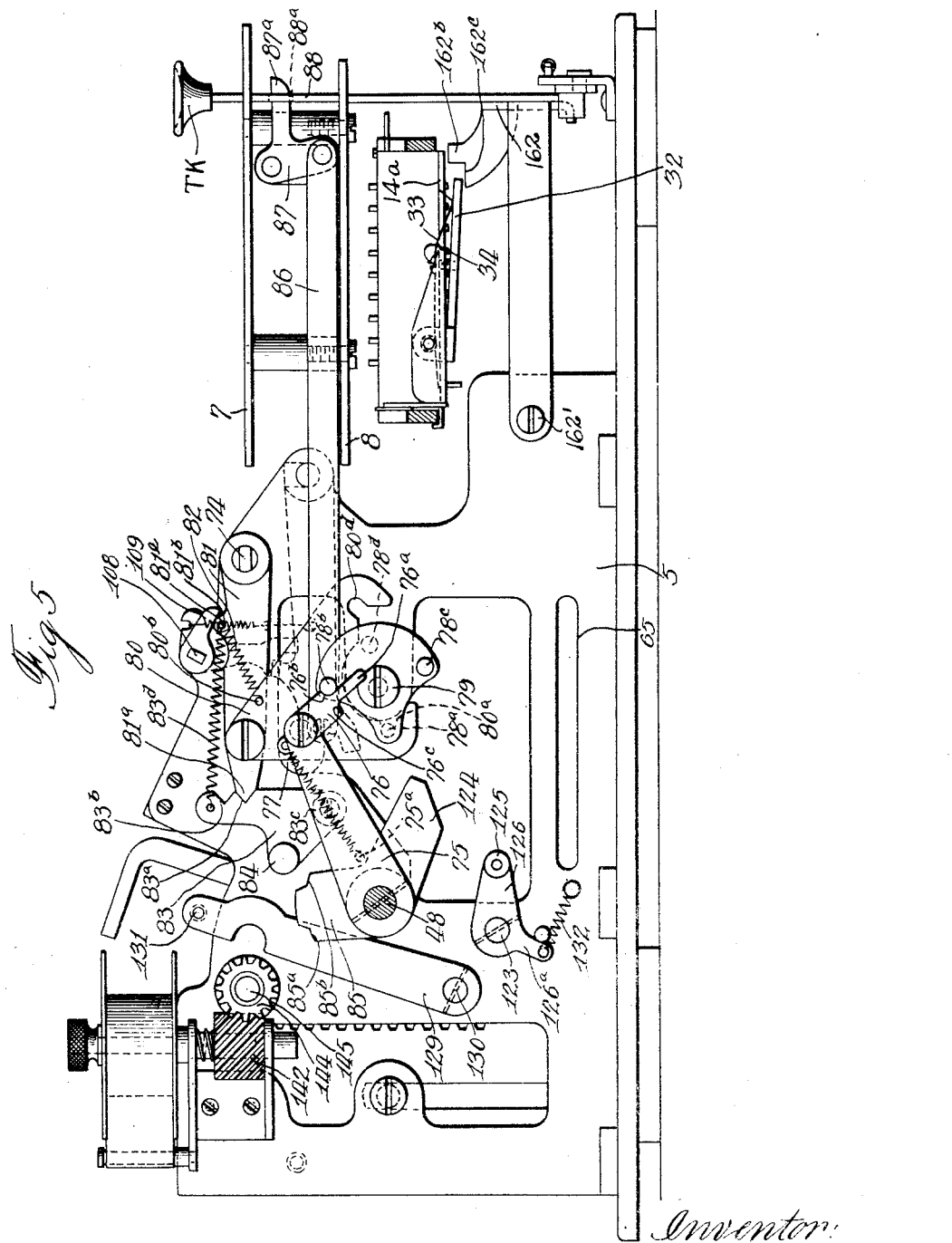

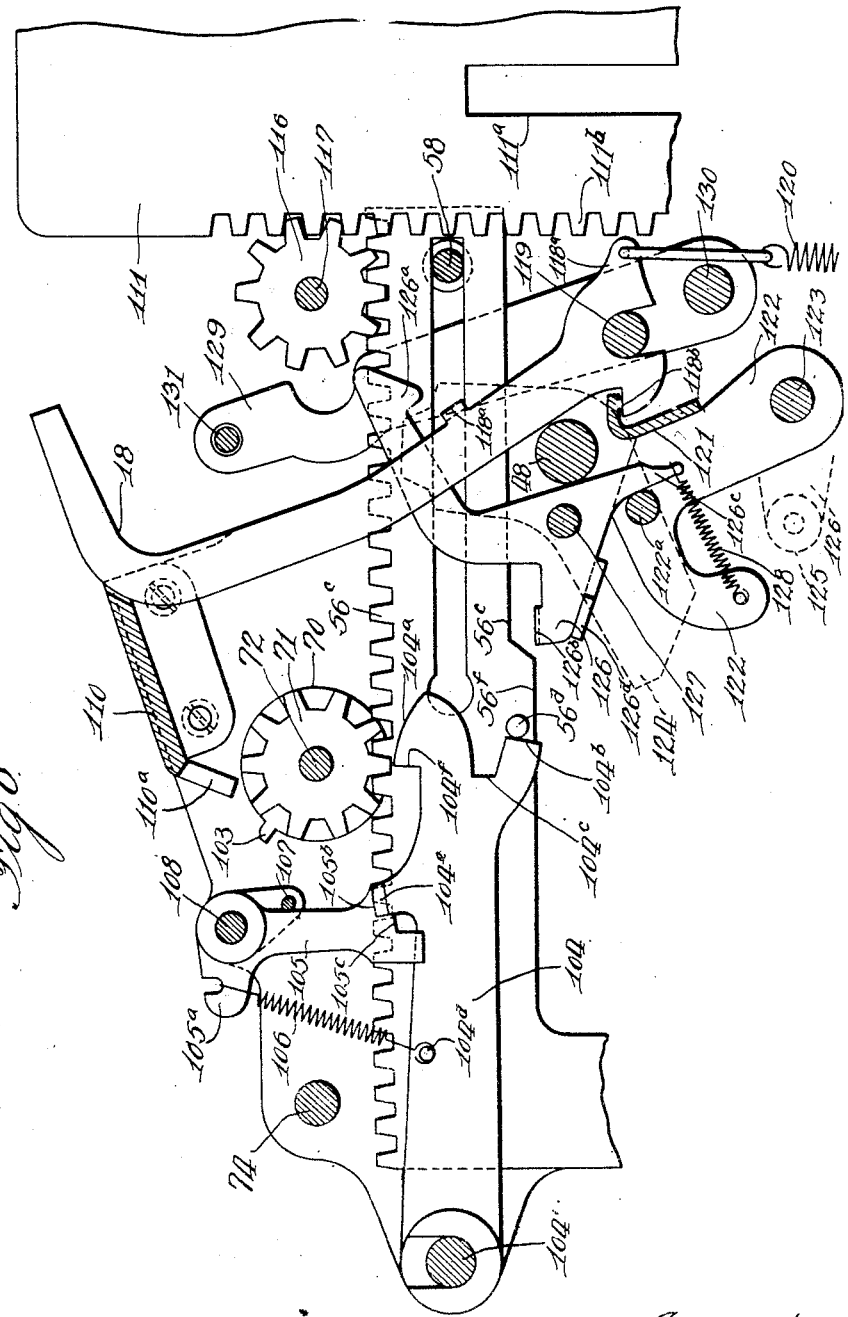

Feb. 28, 1933.　　　T. O. MEHAN　　　1,899,444
ADDING AND LISTING MACHINE
Filed Dec. 5, 1925　　7 Sheets-Sheet 7
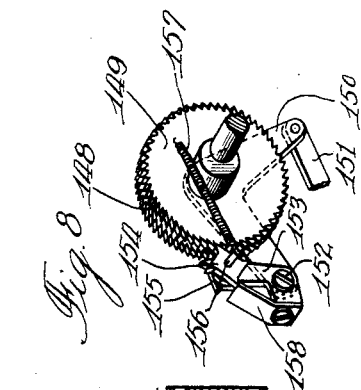
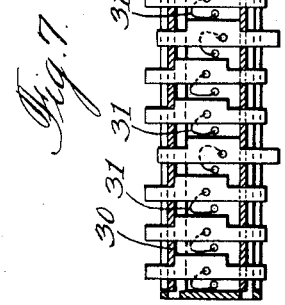
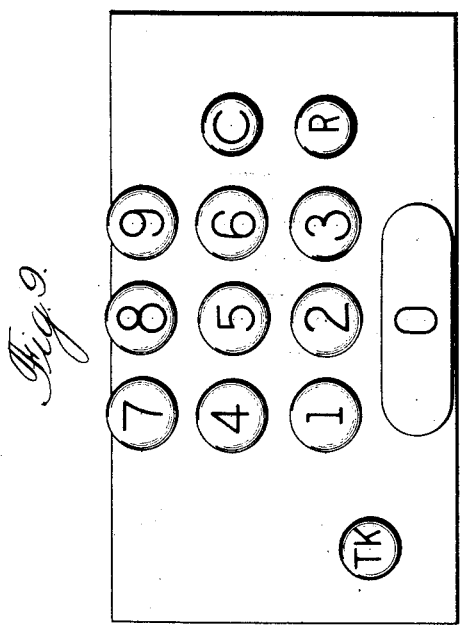
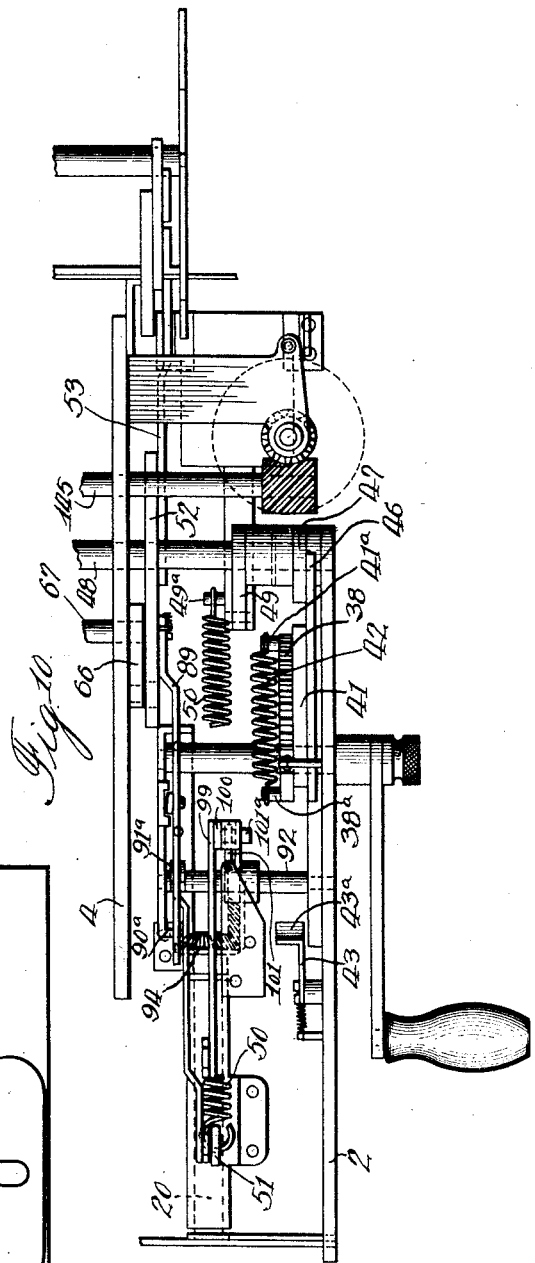
Inventor:
Thomas O. Mehan
Williams, Bradbury,
By McCaleb & Hinkle Attys.

Patented Feb. 28, 1933

1,899,444

UNITED STATES PATENT OFFICE

THOMAS O. MEHAN, OF JACKSONVILLE, ILLINOIS, ASSIGNOR, BY MESNE ASSIGNMENTS, TO REMINGTON RAND INC., A CORPORATION OF DELAWARE

ADDING AND LISTING MACHINE

Application filed December 5, 1925. Serial No. 73,393.

My invention relates to an adding and listing machine of the ten key, key-set type in which a movable pin carriage is employed as the stop mechanism. It is the object of my invention to provide a light, portable and compact adding and listing machine having a small number of parts, which can be cheaply manufactured, is simple in construction and operation and yet retains the durability, reliability, and facility of operation formerly found only in the heavier and larger machines.

A further object is to provide an adding and listing machine of the ten key key-set type in which the accumulator, and also the printed record are clearly visible to the operator.

A further object is to provide a simple form of set-up means wherein the key stems cooperate directly with the settable stops.

A further object is to provide novel forms of interlocking mechanism to prevent misoperation of the machine.

A further object is to provide a novel form of ribbon feeding and ribbon reversing mechanism.

A further object is to provide a simplified form of transfer mechanism.

A further object is to provide a novel form of printing hammer release mechanism.

Other objects will appear from the following description reference being made to the accompanying drawings in which Figure 1 is a right side elevation showing particularly the main operating mechanism.

Figure 2 is a plan view with the key board and other parts omitted.

Figure 3 is a front elevation of the keyboard and set up mechanism.

Figure 4 is a longitudinal vertical section taken on the line of 4—4 of Figure 2, some of the parts being omitted.

Figure 5 is a left side elevation, some of the parts being omitted.

Figure 6 is a detailed view of the transfer and the printing mechanism.

Figure 7 is a detailed cross sectional view of the settable stop carriage.

Figure 8 is a perspective view of the ribbon feeding and reversing mechanism.

Figure 9 is a plan view of the keyboard.

Figure 10 is a plan view of the operating and pin carriage restoring mechanisms.

General construction

My improved adding and listing machine is of the type known as the ten key key-set, pin carriage type. In general it includes a set of ten digit keys whose stems operate directly upon the settable pins of the traveling pin carriage, the actuating racks having toes which upon the forward operation of the handle move backwardly limiting against the set stops. The type bars are operatively connected to these racks. The printing hammers are released at the end of the forward stroke of the operating handle and the accumulator which has visible numeral wheels is thrown in mesh with the racks at the beginning of the return stroke. On the return stroke the number is run into the accumulator. Upon the taking of a total, the meshing operation of the accumulator is reversed as is usual and well known in the art. My machine is equipped with a repeat key, correction key and a total key, the latter being capable of being manipulated so as to take a sub-total.

The machine is shown without the casing which may be of any suitable design to cover and protect the working parts. The machine is built on a base 1 and the working parts are suitably supported in side frames 2, 3 and intermediate frames 4, 5 secured to the base.

Set-up mechanism

Ten digit keys 6, having offset stems 6a, are slidably mounted in the key board plate 7 and have longitudinally aligned projections 6b extending through slots 8a in the lower plate 8 which is rigidly secured to the plate 7. The keys 6 are resiliently held in their upper positions by coiled compression springs 9, and are limited in their downward movement by engagement of their shoulders 6c with the plate 8. Each key stem has a shoulder 6d overlying the bail rod 10 carried by the arms 11 which are rigidly secured to the rod 12. The rod 12 is pivotally mounted in upwardly projecting ears of the plate 8.

Upon depression of the digit keys "0" to "8", the aligned projections 6b of the key stems 6 of these keys are adapted to engage and depress the stops or set-up pins 13 carried in the carriage frame 14. The "9" key does not set a stop 13, a bar 13b fixed to the bottom plate 14a of the carriage frame acting as a permanent "9" stop. A pair of rails 15 are secured at their ends in the side frames 2 and 3 and form a track for the rollers 16 which are rotatably secured to the carriage frame 14 and thus support the carriage for transverse movement.

The carriage is resiliently urged to the left (Figure 3) by the spring 17 which at one end is secured to the bracket 18 and at the other end to the arm 19 which is pinned to the shaft 20. A link 21 at its ends is pivotally connected to the arm 19 and to an offset lug 22a depending from the escapement rack 22 which is secured to the carriage frame 14. The lug 22a and the lugs 22b and 22c project beneath the rail 15 and thus hold the carriage to the front rail 15 while similar lugs 23 (Figure 4) hold the carriage down on the rear rail.

The escapement rack 22 has a plurality of teeth 22d along its front edge. These teeth are engaged by a pawl 24 which is pivotally mounted at the end of an arm 25, the point 24a of the pawl being resiliently held in engagement with a rearwardly projecting lug 25a on the arm 25 by means of the spring 26. The arm 25 is pivotally mounted on the fixed stud 27 and is forced upwardly by the spring 28, and is operatively connected to the bail arm 11 by the link 29.

The depression of a digit key will move the parts 10, 11, 29, 24 and 25 downwardly, until the point 24a of the pawl 24 lies beneath one of the teeth 22d of the escapement rack, and the carriage will be temporarily restrained from movement to the left by the engagement of the lug 25a with one of the teeth 22d. Upon release of the digit key, the above named parts will return to normal position. In so doing the pawl point 24a will engage and slide along the lower surface of the tooth 22d of the escapement rack and permit the tooth to escape between it and the lug 25a. The carriage is thus permitted to move to the left one step with each actuation of a digit key, being stopped by the engagement of the pawl 24 with the next tooth 22d of the escapement rack, thereby bringing the next longitudinal row or denominational order of stops 13 beneath the row of key stem projections 6b.

As best shown in Figure 7, the stops 13 are supported for limited vertical movement in stop guides 30. Fine wire springs 31 have one end secured to the stops 13 and the other end secured to the stop guide 30 so as to be bent in the shape of a horseshoe. It will be noted that the springs 31 tend to maintain the stops 13 in either one of their extreme positions. In other words the spring always tends to force the stop away from the central position and will tend to hold the stop in either its raised or its lowered position.

Pivoted to the carriage frame 14 is a restraining plate 32, which is held in its lowered position by gravity and a light spring 33. Downward pivotal movement of the plate 32 is limited by the screw 34 which freely passes through the bottom plate 35 (which forms part of the carriage frame) and screws into the restraining plate 32. The function of this plate 32 will be described later.

*Operating mechanism*

The machine is shown as hand operated by the crank handle 36 (Figure 1) which is removably secured to the suitably journaled shaft 37. The full stroke mechanism is of the usual double acting pawl type and consists of the saw-toothed sector 38 fixed to the shaft 37 and the double acting pawl 39 which is resiliently held in vertical position by the spring 40.

The mechanism presently to be described is provided to temporarily prevent the return of the operating handle if it is pulled forwardly too rapidly, and thus prevent misoperation and possible breakage of parts of the machine. A cam sector 41 is freely mounted on the shaft 37 adjacent the full stroke sector 38. The cam sector 41 is constrained to move with the full stroke sector 38 upon the forward stroke by means of the heavy spring 42 which is secured to the pin 38a on the full stroke sector and to the pin 41a on the cam sector 41. When the handle is operated at an excessive speed the cam sector is permitted to lag behind the full stroke sector due to this resilient connection. A latch 43 pivotally mounted on the inside of the side frame 2 is normally held in its lower position, engaging a fixed stop pin 44, by a spring 45. The end of the latch 43 has a bent over hook portion 43a which is positioned for engagement with the peripheral edges of both the full stroke sector 38 and the cam sector 41 when the latter are in the position occupied at the end of the forward stroke. The hook portion 43a is adapted to drop into the notch 38b of the full stroke sector at substantially the end of the forward stroke of the operating handle when, as is the case when the handle is too rapidly operated (and the cam sector lags behind the full stroke sector), the high portion 41b of the cam sector does not prevent it from doing so. After the cam sector "catches up" with the full stroke sector, its high portion 41b cams the hook 43a out of engagement with the notch 38b and permits the full stroke and cam sectors to return to normal position.

A link 46 at one end is pivotally secured to the cam sector 41 and at its other end to the end of an arm 47. The arm 47 is pinned to the operating shaft 48 which is journaled in the side frames 2, 3 and the intermediate frames 4, 5. An arm 49 which is fixed to the shaft 48 at its end is pivotaly connected to the piston rod of the usual dash pot 48a. A heavy spring 50 secured at one end of the fixed bracket 51 and at the other end to a pin 49a on the arm 49, supplies the energy for operating the machine on the return stroke.

The slotted cam plate 52 is rigidly secured to the operating shaft 48. A link 53 pivoted to this plate is the operative connection for advancing the rotatable platen 54 which carries the usual strip of paper from the roll 55. The paper feeding and platen supporting mechanism may be of any well known construction and therefore will not be described in detail. Suffice it to say that with each operation of the machine the platen is rotated a distance sufficient to bring the printed amount to a visible position above the ribbon and to bring a new portion of the paper to the printing line.

Actuating mechanism

A plurality of actuators 56, (nine in the machine shown) are mounted for longitudinal sliding movement, being guided at their lower horizontal portions by a pair of opposed combs 57 and at their upper horizontal portions by a rod 58 fixed in the intermediate frames 4, 5. The rod 58 is annularly slotted to receive the actuators and thus maintain them in suitable spaced relation.

A slide 59 having slots 59a is slidably secured to each actuator 56 by a pair of shoulder rivets 60 which extend freely through the slots 59a and are fixed in the actuator 56. A spring 61 secured to the rear rivet 60 at one end and to a pin 59b on the slide 59 at the other, tends to move the slide 59 to its rearward position on the actuator 56, which effect is utilized in transferring operations as will be described hereinafter. A tensile spring 62 has one end secured to a depending toe 59c at the forward end of the slide 59 and has its other end anchored to a fixed rod 63 at the rear of the machine. This spring tends to move the slide and the actuator rearwardly as a unit. The slide 59 is normally restrained from such rearward movement by the engagement of a notch 59d at its rear end with the restoring rod 64, the ends of which slide in the slots 65 formed in the intermediate frames 4 and 5. Upon the forward stroke of the operating handle the cam 52 is rotated counter clockwise (Figure 4) and through the engagement of its slot 52b with the roller 65 on the arm 66 which is pinned to the shaft 67, rocks this shaft (which is journaled in the intermediate frames 4, 5) counter clockwise also. A pair of arms 68 are fixed to the shaft 67 near its ends just inside of the intermediate frames 4 and 5. Links 69 at one end are pivotally secured to the arms 68 and at the other end to the restoring rod 64. Upon the forward stroke of the handle the restoring rod 64 will be moved rearwardly and the slides 59 and the actuators 56 will be free to follow, being moved by their tension springs 62 until the projections 56b strike the stops 13 which have been previously depressed by the actuation of the digit keys. When a number having fewer than nine digits (the capacity of the machine as shown) is added, the actuators in the unused denominational orders are held in normal position by the engagement of their projections 56b with the forward edge of the restraining plate 32, which is normally in the position as shown in Figure 4. Upon the return stroke of the handle the restoring rod 64 is moved forwardly to return the slides and actuators to normal position.

Accumulator shifting mechanism

The accumulator consists of a plurality (nine in the machine shown) of numeral or registering wheels 70 having ten-toothed pinions 71 integral therewith and being freely rotatable on the accumulator shaft 72 which at its ends is carried by the arms 73. The numeral wheels are arranged to be clearly visible through an appropriate aperture in the casing. The arms 73 are pinned to a shaft 74 which is journaled in the intermediate frames 4 and 5 so that when the shaft 74 is rocked the accumulator pinions 71 will be brought into and out of mesh with the racks 56c.

The mechanism for rocking the shaft 74 will now be described. Rigidly secured to the left hand end of the operating shaft 48 (Figure 5) is an arm 75 at the end of which a double acting wipe pawl 76 is pivotally mounted. A spring 77 attached to a pin 75a on the arm 75 and to the wipe pawl 76 at a point opposite its finger 76a tends to keep the finger pointing outwardly in the direction of the arm 75. Notches 76b and 76c are formed in the wipe pawl and are adapted to alternately engage the pins 78b and 78c respectively. The pins 78b and 78c are set in a plate 78 carried by stud 79 screwed into the frame 5. Pins 78a and 78d set in the plate 78 on its inner (right hand) side, are adapted to engage in the respective notches 80a and 80d formed in the member 80, this member being pivotally secured to the arm 81. The arm 81 is pinned to the shaft 74 which it will be recalled, upon rocking, will shift the accumulator into and out of mesh with the actuator racks. A spring 82 fastened between pins 80b and 81b tends to keep the notch 80a of the plate 80 in engagement with the pin 78a which is the position assumed in the normal adding operations. The arm 81 has a wedge shaped point 81a which is adapted to enter either of the notches 83a or 83b formed in the locking member 83, which is pivotally mounted on the intermediate frame at 83c. A spring 83d tends to hold the locking member 83 in engagement with the point 81a. The locking member 83 carries a roller 84 which lies in the plane of a cam 85, which is rigidly secured to the operating shaft 48. This cam has a central high portion and two lower portions 85a and 85b on its cam surface.

The accumulator pinions which are normally in mesh with the actuator racks are raised out of mesh during the initial part of a forward stroke. Upon clockwise movement (Figure 5) of the arm 75, the notch 76b engages the pin 78b and forces the plate 78 clockwise which latter movement is communicated to the shaft 74 through the pin 78a, member 80 and arm 81. The wedge shaped point 81a cams the locking member 83 counter clockwise against the tension of the spring 83d and engages in the notch 83b. The low portion 85b of the cam 85 being below the roller 84 at this time, such movement of the locking member 83 is possible. Upon further operation of the handle the high portion of the cam 85 will lie beneath the roller 84, thus preventing movement of the locking member 83 and consequently locking the accumulator pinions out of engagement. At the end of the forward stroke the lower portion 85a of the cam will lie beneath the roller 84 thus permitting the accumulator pinions 71 to move downwardly into mesh with the actuator racks 56c. This movement is accomplished by the engagement of the wipe pawl notch 76c with the pin 78c at the beginning of the return stroke, thus rotating the plate 78 counter clockwise and forcing the member 80 downwardly.

Upon taking a total it is necessary to have the accumulator pinions in mesh with the actuator racks upon the forward stroke and out of mesh on the return stroke. This is accomplished as is well known in the art by shifting the member 80 clockwise so that the pin 78d is cammed into the notch 80d. The effect of the movements of the plate 78 upon the accumulator will thereby be reversed. The member 80 is thus shifted upon the taking of a total by a link 86 which is operatively connected to the total key TK by means of the bell crank 87, one arm 87a of which extends through a slot 88a in the stem 88 of the total key TK.

A sub-total may be taken by holding the total key TK depressed during the forward stroke and releasing it upon the return stroke. The accumulator pinions will thus be maintained in engagement with the actuator racks throughout the forward and return strokes and a sub-total taken as is well known in the art.

*Pin carriage restoring mechanism*

Near the end of the return stroke, the pin carriage 14 is restored to its normal right hand position (Figure 3). During the return to this position the stops 13 which were depressed are raised to normal position by being cammed upwardly through engagement of their lower ends with the cam plate 88'.

Mechanism for returning the pin carriage to normal position comprises an arm 89 (Figure 1) which is pivotally secured to the cam plate 52 and slides freely in an open slot formed in the bracket 90. A spring 89b having one end secured to the cam plate 52 and the other end to a rearwardly projecting ear on the arm 89 tends to turn the arm counterclockwise. A notch 89a in the forward end of the arm 89 is adapted to engage a pin 91a extending from an arm 91 which is pinned to the short shaft 92. Also pinned to the shaft 92 is a beveled gear sector 93 which meshes with a beveled gear 94 which is fixed to the shaft 20. It will be recalled that the shaft 20 is operatively connected to the carriage 14, so that the rocking of this shaft will cause corresponding reciprocation of the carriage. It will therefore be evident that when, near the completion of the return stroke, the arm 89 moves forward in engagement with the pin 91a, the movement will be communicated through the arm 91, shaft 92, bevel gear sector 93, bevel gear 94, shaft 20 and arm 19 and thus restore the carriage to its normal position. The bracket 90 at its forward end has an upwardly extending projection 90a which is engaged by the front end of the arm 89 and frees the notch 89a from engagement with the pin 91a near the termination of its forward movement.

The return of the carriage 14 to its normal position as just described, may be prevented by the depression of the repeat key R, the stem 95 of which is slidably mounted in the upper key board plate 7. A notch 95a is provided in the stem 95 so that during multiplying operation the key may be latched in its depressed position. A centrally pivoted lever 96 operatively connects the key stem 95 with the link 97 which at its lower end is guided for vertical sliding movement by the bracket 90. At its lower end the link 97 carries a pin 97a which lies beneath the arm 89. Depression of the repeat key will raise the link 97 and the arm 89, and thereby prevent the engagement of the notch 89a with the pin 91a. Thus the carriage is not returned to normal position and the set-up thereon is retained and repeat operations made possible.

Means for canceling the "set-up" on the carriage is provided so that the "set-up" may be eliminated from the machine in case error has been made in the depression of the keys. A correction key C having a stem 98 is connected by means of a centrally pivoted lever 99 to a link 100. Fixed to the shaft 92 is an arm 101 which has a pin 101a integral therewith. This pin projects through a slot 100a in the link 100. A spring 102 connected to the rear end of the lever 99 tends to maintain the correction key in normal position. The full depression of the correction key C will raise the link 100 and rotate the shaft 92 counter clockwise and thus through the mechanism previously described restore the carriage to normal position.

Transfer mechanism

The transfer or carrying mechanism is a very simple embodiment of the type in which the actuator rack of the order into which a transfer is to be made is permitted to move an additional distance beyond normal to rotate the accumulator wheel an additional unit.

Each numeral wheel 70 carries a lug 103 which when the numeral wheel passes from nine to zero contacts with the cam surface 104a of the transfer member 104 associated with the actuator 56 of the next higher denominational order, and depresses it sufficiently to permit a pin 56d (fixed in the actuator 56) which normally is stopped by the end surface 104b, to enter the notch 104c. Latch 105 pivotally mounted on a shaft 108 is resiliently urged counter clockwise (Figure 6) by means of a spring 106 which at one end is attached to an ear 105a of the latch 105, and at the other end is secured to a pin 104d on the member 104. This spring 106 not only tends to swing the latch about its pivot but tends to hold the member 104 in raised position. The member 104 has a sidewardly projecting lug 104e which is normally in engagement with the notch 105b of the latch 105. When the transfer member 104 is depressed by the lug 103 the latch 105 will swing counter clockwise, and the member 104 held depressed by the engagement of its lug 104e with the notch 105c.

A restoring bail 107 which is pinned to the shaft 108 is rocked clockwise (Figure 6) at the beginning of each adding or blank operation of the machine, and engages the latches 105 which have been swung counter clockwise in effecting a transfer, and restores them and consequently their associated members 104 to normal position. The means by which the bail 107 is rocked is best shown in Figure 5. The arm 81, previously referred to, has a small projection 81c which, when the arm is raised to disengage the accumulator pinions from the actuator racks, abuts against a short arm 109 which is fixed at the end of the shaft 108, to which, as has been said, the bail 107 is also pinned. An aligner 110 (Figure 6) has depending prongs 110a which are engaged by the accumulator pinions 71 to locate them in their correct position and to prevent their accidental rotation when they are not in mesh with the actuator racks.

Printing mechanism

The type bars 111 (Figures 4 and 6) are guided for vertical sliding movement by fixed combs 112 and 113. The type bars are vertically slotted at 111a to fit in annular grooves formed in a fixed rod 114 and thus hold the type bars in proper spaced relation. The type 115 may be slidably secured to the bar 111 in any suitable manner as is well known in the art. Racks 111b formed on the front edges of the type bars 111 are in mesh with pinions 116 which are freely mounted in suitable spaced relation on the ribbon feed shaft 117. The pinions 116 are also in mesh with the actuator racks 56c and thus transmit the differential motion of the actuators to the type bars.

The type hammers 118 are freely pivoted on a shaft 119 and urged to type striking position by means of springs 120 which at one end are anchored to the rod 63 and at the other end secured to rearwardly projecting ears 118a.

The hammers 118 are normally held in their forward inoperative position by the engagement of the sear 121 over the toes 118b. The ends of the sear 121 are secured to a pair of bail arms 122 which are fixed to the shaft 123 just inside the intermediate frames 4 and 5. Near the end of the forward stroke the cam 124, (Figure 5) which is integral with the cam 85, engages the roller 125 carried at the end of an arm 126 which is pinned to the left hand end of the shaft 123 and rocks this shaft counter clockwise (Figure 6) to release the hammers 118.

It is desirable to prevent the printing of zeros to the left of the number printed, in the event that the number has fewer digits than the capacity of the machine. This is accomplished by restraining each of the hammers in the denominational orders higher than the highest order digit of the number being added by means of a hook member 126 having the hook portion 126a engaging over a lug 118c on the hammer. The hook member 126 is pivoted on a fixed rod 127 and has a lug 126b which projects sidewardly so as to lie beneath the adjacent actuator 56. The hook member 126 also has a downwardly projecting arm 126c which is resiliently held against a rod 122a, carried by the bail arms 122, by a spring 128. Upon the initial movement of the shaft 123 and hence the forward movement of the rod 122a, the hook member 126 will tend to move clockwise (Figure 6) under the influence of the tension of the spring 128. Such movement will be permitted in the denominational orders in which the actuators have not moved rearward, since in these orders the lugs 126b will be free to move upwardly against the rear lower edge of the actuators 56 which are cut away at 56e. In the orders in which the actuators have moved rearward preparatory to adding one or more into the accumulator, the lugs 126b will engage the lower edges 56f of the actuators and thus prevent the hook members 126 from moving clockwise and from having their hook portions 126a hook over the lugs 118c of the hammers 118. In order to print the zeros in such numbers as 100 or 4010 each hook member 126 has a lug 126d which extends to the side so as to lie beneath the lower edge of the hook member 126 of the higher denominational order at its immediate left. It will thus be apparent that when a member 126 is prevented from rocking clockwise by engagement of its lug 126b with the lower edge 56f of the actuator, all the hook members 126 to the right will also be prevented from rocking on the rod 127 because each member 126 overlies the lug 126d of the member at its immediate right. Since the lugs 126b are not in contact with actuators 56 while they are in motion, there is no friction between these parts, thus lightening the power necessary to operate the machine.

A pair of bail arms 129 pinned to the pivotally mounted shaft 30 carry the hammer restoring bail rod 131. The right hand bail arm 129 carries a roller 129a (Figure 4) which slides in the slot 52c in the cam plate 52. Upon the return stroke, the bail rod 131 will engage the hammers 118 which have been tripped and will restore them to normal position where the sear 121 will again engage over the toes 118b, the sear being resiliently urged to the rear by the spring 132 (Figure 5) which is attached to an ear 126a on the arm 126.

*Ribbon feed and reversing mechanism*

A ribbon 133 carried on the spools 134 is guided behind the line of type by a pair of headed pins 135, the spools being secured to shafts 136 and 137 by thumb nuts 138. The shafts 136 and 137 are rotatably mounted in the brackets 139 and 140 respectively, having friction means 139a to provide proper tension on the ribbon. The lower ends of the shafts 136 and 137 carry spiral gears 141 and 142 respectively which are in mesh with the spiral gears 143 and 144 respectively.

The spiral gear 144 is fixed to end of the ribbon feed shaft 145 which is journaled in intermediate frames 4 and 5. The spiral gear 143 is secured to a sleeve 146 which is freely rotatable upon the shaft 145 being restrained from axial movement by a washer 147 fixed by a screw to the end of the shaft 145. A ratchet wheel 148 is fixed to the shaft 145 while a similar ratchet wheel 149 is secured to the left hand end of the sleeve 146. A bell crank lever 150 is pivotally mounted on the shaft 146 between these two ratchet wheels 148 and 149. One arm of the bell crank 150 is operatively connected to the cam plate 52 by means of the link 151. The bell crank 150 is thus given a complete oscillation with each operation of the machine. The other arm of the bell crank 150 carriers a stud 152 upon which an arm 153 is pivotally mounted. A pair of star shaped pawls 154 and 155 each having four teeth are secured to a small pin 156 which is mounted for free rotation at the end of the arm 153. A spring 157 secured at one end to the pin 156 and at the other to the bracket 139 tends to keep the pawls 154 and 155 in engagement with the teeth of the ratchet wheels 149 and 148 respectively. The flat spring 158 secured to a forward and sideward projection on the arm 153 engages the pawls 154 and 155 and tends to prevent them from rotating on their pin 156. It will be noted that teeth of the pawl 154 are staggered with respect to the teeth of the pawl 155 so that a tooth of only one of the pawls will be in engagement with its corresponding ratchet wheel at one time. The ribbon will thus be wound in one direction by one of the pawls engaging with one of the ratchet wheels until it has been entirely wound up upon one of the spools. When the ribbon has been completely unwound from one spool there will naturally be an increased resistance to further rotation of the corresponding driving ratchet wheel. When the arm 153 is moved upwardly the tooth of the pawl 154 or 155 which happens to be engaged with a ratchet wheel will force the pawls to rotate 45° in a clockwise direction against the frictional and pressure action of the spring 158. The tooth of the other pawl will then be brought into engagement with its ratchet wheel and the ribbon feed will proceed in the reverse direction. The upper edge of the spring 158 by engagement with the radial faces of the teeth of either pawl 154 or 155 normally prevents counter clockwise movement of the pawls, and by pressure upon the sloping portion of the tooth of one pawl holds the radial face of the tooth on the other pawl in contact with the end of the spring.

*Total taking and total key interlocking mechanism*

As shown in Figure 3, the total key stem 88 has a notch 88b at its lower end which engages over a pin 159a of a lever 159 which is centrally pivoted on the bracket 18. A spring 160 secured to a fixed bracket 161 at one end and to the end of the lever 159 at the other tends to maintain the left hand of the lever 159 and the total key in raised position. A bail 162 pivoted to the intermediate frames 4 and 5 by screws 162' is operatively connected to the right hand of the lever 159 by means of the link 163. It will thus be seen that the depression of the total key will raise the forward end of the bail 162. This bail serves the double purpose of preventing the taking of a total when the carriage 14 is displaced from normal position or when one of the actuators 56 is displaced forward of its normal position, as is the case when it has effected a transfer operation. The forward portion of the bail 162 has a rearwardly projecting flange 162a at its lower edge. This flange lies beneath the forward ends of the actuators 56 when the latter are in their forward positions after having effected a transfer, but clears the forward ends of the actuators when they are in normal position. An upwardly and rearwardly projecting lug 162b (Figure 5) lies beneath the lower plate 14a of the carriage frame when the carriage is displaced from its normal right hand position. It will thus be seen that it is impossible to depress the total key unless all of the actuators 56 are in normal position and the carriage 14 is also in normal position. The lug 162b also has a rearwardly projecting shoulder 162c which lies beneath and is adapted to engage the lower side of the plate 32. Upon the taking of a total the actuators 56 are thus released by the raising of the plate 32, which normally prevents the actuators from rearward motion. Upon operation of the handle in a total taking operation the accumulator pinions 71 will first be enmeshed with the actuator racks 56c as has been previously described. Upon the rearward motion of the restoring rod 64 the actuators will be permitted to move rearwardly under the tension of their springs 62 until the lugs 103 of the accumulator wheels engage zero stops 104f at which position the accumulator wheels will be in zero position. Upon the return stroke the accumulators will be disengaged from the actuator racks 56c and all parts restored to normal position as has been previously described and is well known in the art.

*Operation*

The operation of the various parts of the machine has been generally described with reference to each group of parts. It will now merely be necessary to describe the operations of the machine in general terms. Before commencing an adding operation it is desirable to clear the machine by the depression of the total key and completion of a total taking operation. The digit keys corresponding to the numbers to be added are depressed in their normal order, thus setting up the number in the pin carriage. Upon operation of the crank the actuators will move rearwardly, being stopped by the stops 13 which have been depressed. The accumulator pinions are then enmeshed with the actuator racks and the actuators returned to normal position. This operation may be repeated until all the desired numbers have been added into the accumulator. The depression of the total key is prevented after a number has been set up in the pin carriage and also when the actuator racks have moved forward the extra step necessary for a transfer. If the latter is the case after the last number has been added into the accumulator, it is necessary to take a blank stroke in order to restore the actuators into normal position. As has been previously said the machine may be operated to take a sub-total by holding the total key depressed only during the forward stroke of the operating handle.

My invention is capable of wide variation and adaptation in many respects for use in different embodiments without departure from the principles of the invention. I do not restrict myself in any unessential particulars but what I claim and desire to secure by Letters Patent is:

1. In a machine of the class described, the combination of a settable pin carriage, and an interlocking mechanism comprising a total key, a bail operatively connected therewith, and a stop on said bail engageable directly with said carriage for preventing the operation of said key when said carriage is displaced from normal position.

2. In a machine of the class described, the combination of actuators adapted to be displaced beyond normal position when effecting a transfer, a settable stop carriage, a total key, and an interlock comprising a bail operatively connected with said key, said bail having stops formed integrally therewith for preventing the operation of said key when said carriage or one of said actuators is displaced from normal position.

3. In a machine of the class described, the combination of actuators adapted to be displaced beyond normal position when effecting a transfer, a movable stop carriage having settable pins, an accumulator, a total key, and a single integral means to prevent operation of said key when one of said actuators or said carriage is displaced from normal position.

4. In a machine of the class described, the combination of an oscillating shaft having a forward and return stroke, a full stroke sector fixed thereto, a cam sector pivotally mounted on said shaft, resilient means connecting said sectors tending to move said cam sector with said full stroke sector on the forward stroke, a latch resiliently urged into position to hold said full stroke sector at the end of the forward stroke, and a camming surface on said cam sector for engaging and releasing said latch from said full stroke sector at the end of the forward stroke of said cam sector.

5. In a machine of the class described, the combination of a carriage having settable stops, actuators cooperating therewith, said actuators being longitudinally movable beneath said carriage and movable beyond normal position when effecting a transfer, an accumulator, a total taking mechanism therefor, a total key for manually controlling said mechanism, and a bail operatively connected to said key and movable upwardly upon depression of said key, said bail having an extension underlying said actuators when the latter are beyond normal position, thereby preventing the depression of said key when one of said actuators is displaced from its normal position in effecting a transfer.

6. In an adding and listing machine, the combination of a carriage having settable stops, actuators cooperating therewith, said actuators being longitudinally movable beneath said carriage and displaced beyond normal position when effecting a transfer, an accumulator cooperable with said actuators, a total taking mechanism therefor, a total key for manually controlling said mechanism, and a bail operatively connected to said key, said bail having an extension underlying said actuators when the latter are displaced from normal position, and a projection engageable with said carriage when the carriage is displaced from normal position, whereby said key may be depressed only when said actuators and said carriage are in normal position.

In witness whereof, I hereunto subscribe my name this 21st day of November, 1925.

THOMAS O. MEHAN.